United States Patent [19]
Ray et al.

[11] Patent Number: 5,727,089
[45] Date of Patent: Mar. 10, 1998

[54] METHOD AND APPARATUS FOR MULTIPLE QUALITY TRANSACTION CARD IMAGES

[75] Inventors: Lawrence A. Ray; Richard N. Ellson, both of Rochester, N.Y.

[73] Assignee: Eastman Kodak Company, Rochester, N.Y.

[21] Appl. No.: 369,015

[22] Filed: Jan. 5, 1995

[51] Int. Cl.$^6$ .................................................. G06K 9/36
[52] U.S. Cl. ...................... 382/240; 382/233; 382/237; 235/380
[58] Field of Search ...................... 382/232, 117, 382/118, 201, 115, 240, 233, 237; 358/452; 235/380

[56] References Cited

U.S. PATENT DOCUMENTS

| | | | |
|---|---|---|---|
| 4,754,487 | 6/1988 | Newmuis | 283/2 |
| 4,849,810 | 7/1989 | Ericsson | 358/133 |
| 4,853,779 | 8/1989 | Hammer et al. | 358/133 |
| 4,878,230 | 10/1989 | Murakami et al. | 375/27 |
| 4,933,761 | 6/1990 | Murakami et al. | 358/133 |
| 5,060,285 | 10/1991 | Dixit et al. | 382/56 |
| 5,122,873 | 6/1992 | Golin | 358/133 |
| 5,124,791 | 6/1992 | Israelsen et al. | 358/136 |
| 5,136,374 | 8/1992 | Jayant et al. | 358/133 |
| 5,223,701 | 6/1993 | Batterman et al. | 235/494 |
| 5,247,348 | 9/1993 | Israelsen et al. | 358/86 |
| 5,247,357 | 9/1993 | Israelsen | 358/133 |
| 5,255,090 | 10/1993 | Israelsen | 358/133 |
| 5,272,529 | 12/1993 | Frederiksen | 358/133 |
| 5,282,255 | 1/1994 | Bovik et al. | 382/56 |
| 5,574,573 | 11/1996 | Ray et al. | 358/452 |

FOREIGN PATENT DOCUMENTS

| | | |
|---|---|---|
| WO 86/07480 | 12/1986 | WIPO. |
| WO 92/02000 | 2/1992 | WIPO. |

OTHER PUBLICATIONS

Proceedings of the British Machine Vision Conference, Proceedings of BMVC '92, BMVC, Leeds, UK, 22-24 Sep. 1992, ISBN 3-540-19777-X, 1992, Berlin, Germany, Springer-Verlag, Germany, pp. 508-517, Ramsay C S et al "A Comparison of Vector Quantization Codebook Generation Algorithms Applied to Automatic Face Recognition".

Vol. 017 No. 331 (E-1386) Jun. 23, 1993 Publication No. JP-A-05 307901; Feb. 12, 1993 Patent Abstracts of Japan.

Vol. 014 No. 205 (E-0921) Apr. 26, 1990 Publication No. JP-A-02 044881; Feb. 14, 1990 Patent Abstracts of Japan.

Vol. 017 No. 444 (E-1415) Aug. 16, 1993 Publication No. JP-A-05 095541; Apr. 16, 1993 Patent Abstracts of Japan.

*Primary Examiner*—Jose L. Couso
*Assistant Examiner*—Anh Hong Do
*Attorney, Agent, or Firm*—Edward Dugas

[57] ABSTRACT

The disclosed method for compressing an image to be stored on a transaction card at one of a plurality of quality levels performs the steps of: a. providing a number of compression codebooks each corresponding to a quality level of the to be compressed image data; b. determining the quality level of the compressed image to be stored on the transaction card; c. determining the compression codebook that best corresponds to the determined quality level of step b; and d. compressing the image with the determined compression codebook. A decompression system is disclosed for processing, the transaction cards having the compressed image data stored thereon at one of a plurality of quality levels by, determining the maximum quality level common to the transaction card and the decompression system; and decompressing the compressed image data at the above maximum quality level. At each quality level of compression/decompression that represented image is of equal size.

2 Claims, 6 Drawing Sheets

| LOW QUALITY CODEBOOK | |
|---|---|
| 000 | CODEBOOK ENTRY 000 |
| 001 | CODEBOOK ENTRY 001 |
| 010 | CODEBOOK ENTRY 010 |
| 011 | CODEBOOK ENTRY 011 |
| 100 | CODEBOOK ENTRY 100 |
| 101 | CODEBOOK ENTRY 101 |
| 110 | CODEBOOK ENTRY 110 |
| 111 | CODEBOOK ENTRY 111 |

FIG. 7A

| HIGH QUALITY CODEBOOK | | |
|---|---|---|
| 000 | 00 | CODEBOOK ENTRY 000 |
| 000 | 01 | CODEBOOK ENTRY 00001 |
| 000 | 10 | CODEBOOK ENTRY 00010 |
| 000 | 11 | CODEBOOK ENTRY 00011 |
| 001 | 00 | CODEBOOK ENTRY 001 |
| 001 | 01 | CODEBOOK ENTRY 00101 |
| 001 | 10 | CODEBOOK ENTRY 00110 |
| 001 | 11 | CODEBOOK ENTRY 00111 |
| 010 | 00 | CODEBOOK ENTRY 010 |
| 111 | | CODEBOOK ENTRY 111 |
| 111 | | CODEBOOK ENTRY 11101 |
| 111 | | CODEBOOK ENTRY 11110 |
| 111 | | CODEBOOK ENTRY 11111 |

METHOD AND APPARATUS FOR MULTIPLE QUALITY TRANSACTION CARD IMAGES

FIELD OF INVENTION

The present invention relates to the field of image compression, and more particularly to the use of a hierarchical compression method for digital image storage on a transaction card to provide multiple compatible image quality levels.

BACKGROUND OF THE INVENTION

Transaction cards are commonplace in daily commerce. The credit card, the automated teller machine (ATM) card, and phone card are examples of transaction cards which store digital information. Since transaction cards provide access to resources, such as currency, the security of the cards is of general interest. Incorporating specific information about the authorized holder of the card (i.e., portrait image, fingerprint, retinal scan) aids in the verification of the identity of the cardholder.

Many transaction cards utilize the digital storage means of the card as an integral part of the card's function. In the case of a credit card, common information stored digitally is the cardholder name, account number, and the card expiration date. It is also possible to store other information such as a compressed image (see U.S. patent applications Ser. No. 08/145,051 entitled "Method And Apparatus For Image Compression, Storage, And Retrieval On Magnetic Transaction Cards" and 08/145,284 entitled "Compression Method For A Standardized Image Library" by the inventors hereof.).

A transaction card storing digital image information in compressed form can be read by a transaction card reader. A transaction card reader is a component of a system found at the transaction point. A point-of-transaction system, more commonly referred to as a point-of-sale device (POS), processes the image compressed information for display by decompressing it into a rendition of the original image.

International agreement (see ISO 7811) have standardized digital information storage capacity and format of financial transaction cards. This places a fixed upper limit on the digital data capacity of standard cards. As a result, to comply with standards, the digital image information must satisfy the storage limitations specified by standard. As there is a plurality of physical transaction card types, there exists a plurality of card standards with different data capacities. For example, the storage capacity of ISO 7816 integrated circuit cards (ICC) greatly exceed the data storage capacities of ISO 7811 magnetic financial transaction cards, and as a result an ICC card has the capability to store a higher quality image than an ISO 7811 magnetic card.

Vector quantization (VQ) is a method of image compression capable of achieving sufficient compression ratios and adequate image quality storage stored on a standard magnetic stripe (see Gray, "Vector Quantization", IEEE ASSP Magazine, April, 1984). A necessary component of the VQ compression method are the codebook(s). A compressed image bit stream is parsed by a decompressor into pointers to codebooks. A codebook consists of a collection of multi-pixel tiles, each tile addressable through a codebook pointer. The pointer indicates which tile should be extracted for use in the decompressed image. The larger the number of codebook tiles, the greater the range must be for the codebook pointer to address them, and in general, the better the image quality of the decompressed image.

A POS may recognize and process information from a plurality of transaction card types with different data capacities. It is desirable to have an apparatus to detect card type and an image compression method which degrades gracefully based on card type from a high data capacity transaction card storing a high quality image to a lower data capacity card storing a lower quality image. The present invention provides a method and apparatus for this multiple quality transaction card image compression system.

SUMMARY OF THE INVENTION

The present invention provides a method for a hierarchical compression of a digital image to multiple compatible image resolutions suitable for storage on a plurality of transaction cards, each having a different digital image data capacity and an apparatus for determination of the transaction card digital image data into the highest quality image.

More specifically the method for processing, by a decompression system, transaction cards having compressed image data stored thereon at one of a plurality of quality levels comprises the steps of:

determining the maximum quality level common to the transaction card and the decompression system; and decompressing the compressed image data at the above maximum quality level.

The method consists of hierarchical compression process where additional data from a high data capacity card contains a subset of data which includes data expected from a low data capacity card. To be noted, with this method the image size represented at each quality level, remains the same. The decompression apparatus can read a card and determine the quality level of the stored image data, and then the decompression apparatus reconstructs the image at the appropriate quality level. The compression method utilizes the databases for decompressing lower quality images as a subset of the databases used for decompressing higher quality images. The database construction procedure can be applied a plurality of times to generate a hierarchy database corresponding to the hierarchy of quality levels.

It is an object of the present invention to provide a transaction card processing system wherein the system automatically determines the maximum image quality level common to the transaction card and the system's display.

Yet another object of the present invention is to provide a system for efficiently reading transaction cards having images stored thereon which images may be recorded at different image quality levels and for displaying the read images at a system quality level.

The above and other objects of the present invention will become more apparent when taken in conjunction with the following description and drawings wherein like characters indicate like parts and which drawings form a part of the present invention.

BRIEF DESCRIPTION OF THE DRAWINGS

FIGS. 7A and 7B illustrate in table form low and high quality codebooks, respectively.

DETAILED DESCRIPTION OF THE INVENTION

Figure 1:
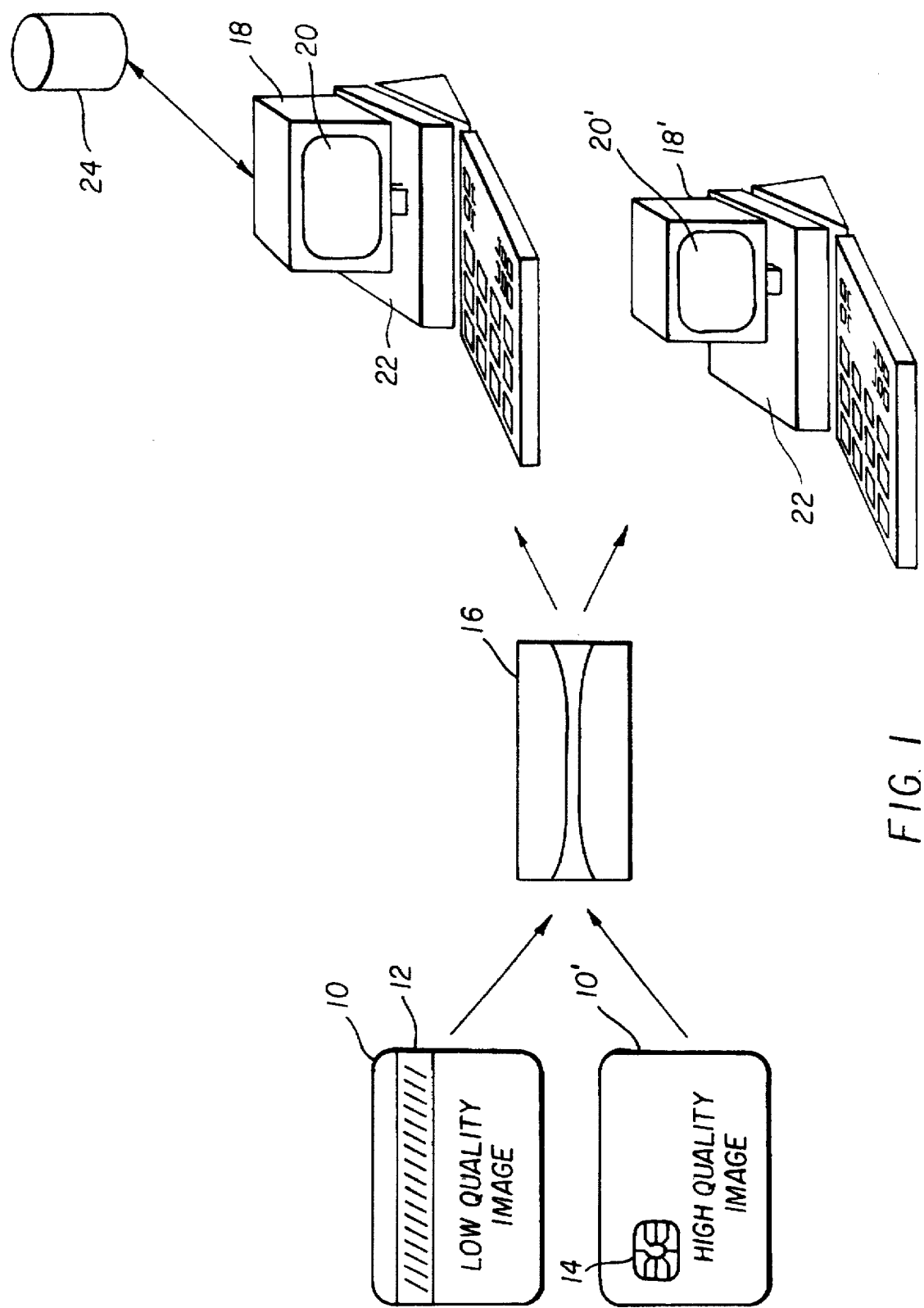
FIG. 1 illustrates a preferred system embodiment of the invention.

Referring to FIG. 1, the system of the present invention incorporates, as an image storage media, transaction cards 10 and 10'. Each transaction card has an image digitally stored thereon. The digital data representing the image is in a compressed format in one of a plurality of possible quality levels. Transaction card 10 represents a conventional card having a magnetic storage stripe 12. Transaction card 10' represents a card having an integrated circuit 14, capable of data storage, imbedded in the card. Such a card is sometimes referred to as a "smart card". It is well understood that digital data storage in conjunction with transaction cards may take a number of forms.

A card reader 16 functions to read the digitally stored data from the transaction cards when inserted in the card reader. The card reader provides as an output the read digital data to a point-of-sale terminal (POS) 18. The POS terminals 18 and 18' interpret the digital data and as one function converts the data into an image and displays the image on an associated display 20 and 20', respectively. Additionally, images of different qualities may be formed on a receipt by receipt printer 22. The terminals 18 and 18' have different data processing capabilities. Terminal 18 is able to process and display low or high quality images. Terminal 18' is capable of processing high quality image data into low quality image data and is capable of processing and displaying low quality images.

An optional augmented image data source 24 may be connected to the POS 18 to provide additional image data to augment the image data provided by the transaction card to convert or upgrade the image data into a higher quality image.

Figure 2:
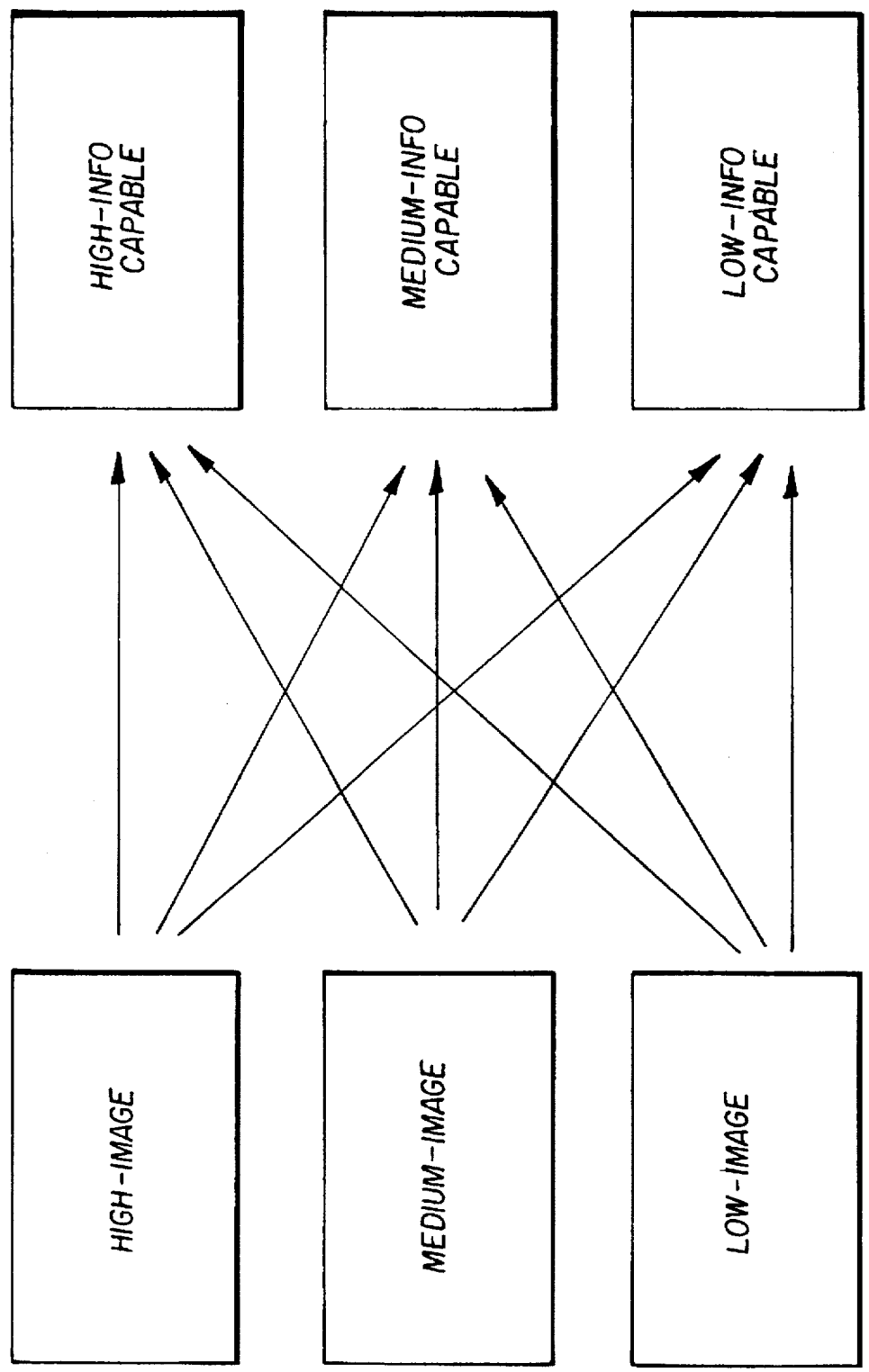
FIG. 2 illustrates, in chart form, a plurality of image qualities interfacing with a plurality of image display systems.

FIG. 2, illustrates, in simplified block form, the compatible functional relationships between different image quality level sources and systems having different processing and display capabilities for processing and displaying the images.

Figure 3:
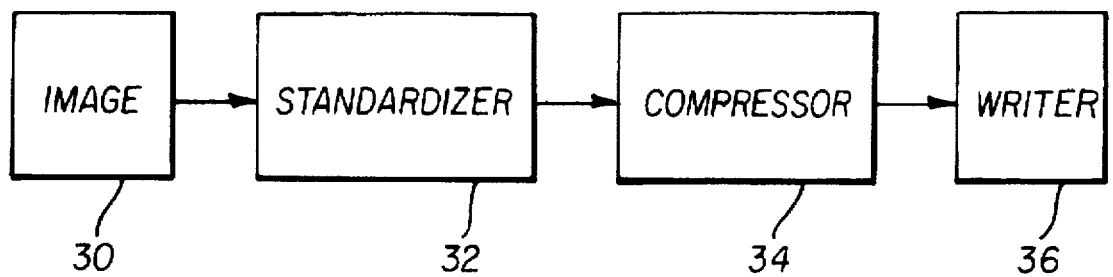
FIG. 3 illustrates in block diagram form a multiple quality image compression process of the present invention.

Referring to FIG. 3, an image 30, which may be a portrait type image is captured digitally. In order to achieve the best results with the image the image can be standardized in size and orientation by the standardizing process 32 which may incorporate standardization methods that locate and position the subject's eyes in specified locations on the image, and for adjusting the tone and contrast of the image to be within prescribed norms. This digital image is compressed using for example a vector quantization compressor 34 (VQ). The VQ compressor 34 preferably functions to preserve the spatial details of the digital image as well as conforming to fixed data storage requirements. The compression is done with a plurality of vector quantization methods, one for each quality level. The vector quantization methods are hierarchical in that a low image quality compression can be recovered from a higher image quality compression in a simple manner. The resultant bit stream from the vector quantization process is then directed to a recording device 36, such as a magnetic card writer where the appropriate bit stream is used depending upon the data capacity of the transaction card.

Figure 4:
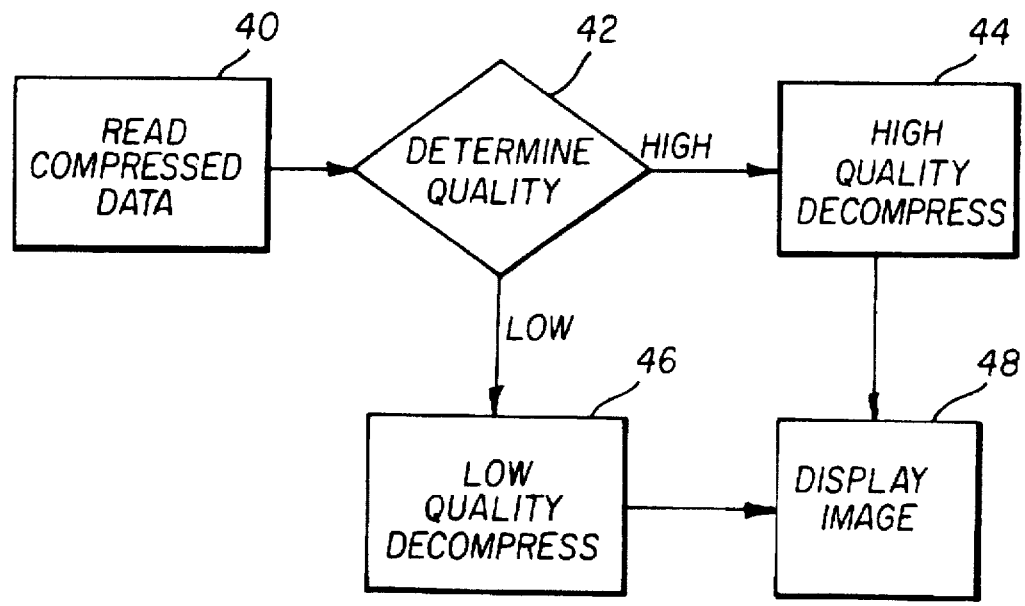
FIG. 4 illustrates in block diagram form a multiple quality image decompression process of the present invention.

Referring to FIG. 4, the process for image decompression is illustrated in block form commences with a reading of the compressed data from the transaction card at block 40. Next the quality of the image data is determined in block 42. Although only a high and a low quality output are shown as the result from block 42 it is to be understood that many different levels between a maximum high and a minimum low may be used and detected. For instance, if the storage media is a magnetic stripe, then a low data capacity card is identified, whereas if an ICC is read, then a high data capacity card is identified. If a low data capacity card is sensed, then the bit stream is processed with the low quality decompress 46 which utilizes a set of low quality codebooks, and if a high data capacity card is sensed, then the bit stream is processed with the high quality decompress 44 that utilizes a high quality set of codebooks. The display image function 48 receives the decompressed image either from 44 or from 46 for display on the display 20, 20', or 22. As an optional system feature, if a low quality image is determined to be present on the transaction card and a high quality image is desired then augmenting data may be acquired from the augmented data source 24 (see FIG. 1).

Figure 5:
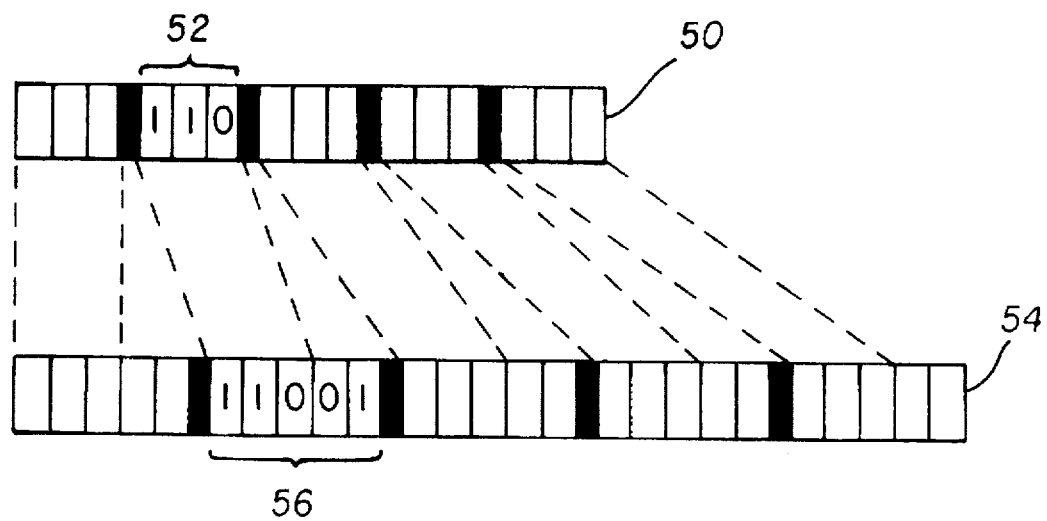
FIG. 5 illustrates a data string expanded to a higher quality data string.

In FIG. 5 a low quality bit stream 50 is shown as a sequence of 3-bit codebook pointers. Also shown is a high quality bit stream 54 formed with 5-bit codebook pointers. Each 3-bit codebook pointer of bit stream 50 has an associated 5-bit codebook pointer in bit stream 54, for example, block 52 and block 56. Block 52 is augmented by the concatenation of 2 additional bits which transform the low quality codebook pointer into a high quality codebook pointer.

Figure 6:
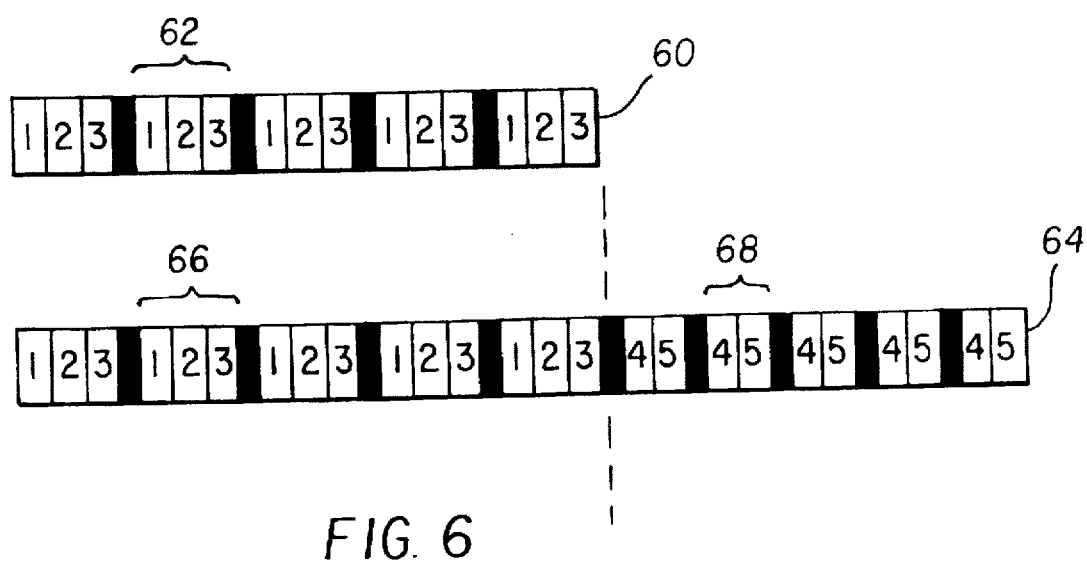
FIG. 6 illustrates a data string expanded to another higher quality data string.

A variant of the bit stream processing of FIG. 5 is shown in FIG. 6. A low quality bit stream 60 is represented as a sequence of 3-bit codebook pointers. Also represented is a high quality bit stream 64 formed with 5-bit codebook pointers. Each 3-bit codebook pointer of bit stream 60 has an associated 5-bit codebook pointer in bit stream 64, for example, block 62 is associated with the bits stored in blocks 66 and 68. Block 62 is augmented by the concatenation of 2 additional bits of block 68 which transform the low quality codebook pointer into a high quality codebook pointer.

Both methods of storing the high quality codebook pointers have the final two bits of the high quality codebook pointers as an extension of the 3-bit codebook pointers of the lower quality codebook pointers. The codebooks are constructed in order to insure compatibility of the dual addressing system.

One embodiment of the codebook structure of the present invention is shown in FIGS. 7A and 7B, respectively. Each codebook entry in the low quality codebook shown in FIG. 7A appears in the high quality codebook of FIG. 7B with the three bits of the low quality codebook pointer matching the first three bits of the high quality codebook pointer.

The selection of the codebook entries is made to insure that the high quality codebook entries are correlated with the low quality codebook entries. The entries for the lower quality codebook are formed by processing or "training" on a collection of image segments extracted from a set of sample images, commonly referred to as the training image set. There are a large number of codebook generation algorithms, and they all attempt to determine an optimal clustering of the data vectors. An example of a commonly used algorithm is the so-called LBG algorithm. The image segments selected can then be used to partition the space of possible image segments into regions. The number of regions that would be partitioned into correspond to the number of entries in the codebook. This partitioning forms the basis for the higher quality codebook which is constructed by a second partitioning process which subdivides each of the original partitions into subregions. Each subregion is represented by a high quality codebook entry. The number of subregions corresponds to the ratio of codebook entries in the high quality codebook versus the low quality codebook.

Referring to the example in FIGS. 7A and 7B, the low quality codebook pointers are 3 bits and capable of pointing to $2^3=8$ codebook entries, and the high quality codebook pointers are 5 bits and capable of pointing to $2^5=32$ codebook entries. The training on the image segments would then be used to select the 8 partitions. Each of the 8 partitions is subdivided into 4 subregions with one subregion. Codebook entries for each of the 8 partitions are determined and stored as the low quality codebook, and the codebook entries for the remaining 24 subregions are determined and combined with the 8 low quality codebook entries to form the 32 entries of the high quality codebook. All subregions from the same partition share the same 3-bit prefix in their respective pointer.

Additionally, in FIGS. 7A and 7B the codebook entry used for a region in the low quality codebook remains fixed and permits the remaining three codebook entries to be optimized. For example, codebook entry 000 of FIG. 7A is identical in pixel content to codebook entry 00000 of FIG. 7B. While the result will clearly be sub-optimal to the unconstrained selection of codebook entries for the high quality codebook, it has the advantage of requiring less codebook storage space since the low quality codebook is completely contained in the high quality codebook.

Another embodiment of the present invention allows for additional differentiation between the low quality and high quality codebooks. Since the compressed image contains a collection of pointers to codebook entries, there is no restriction on the size of the entries themselves, merely that there be a consistency in the content of the image blocks. Hence, the high quality codebook could have not only more entries, but each entry may contain more pixels. For example, a low quality entry might consist of an 8×8 block of pixels, where the high quality entry may consist of a block of 16×16 pixels.

Figure 8:
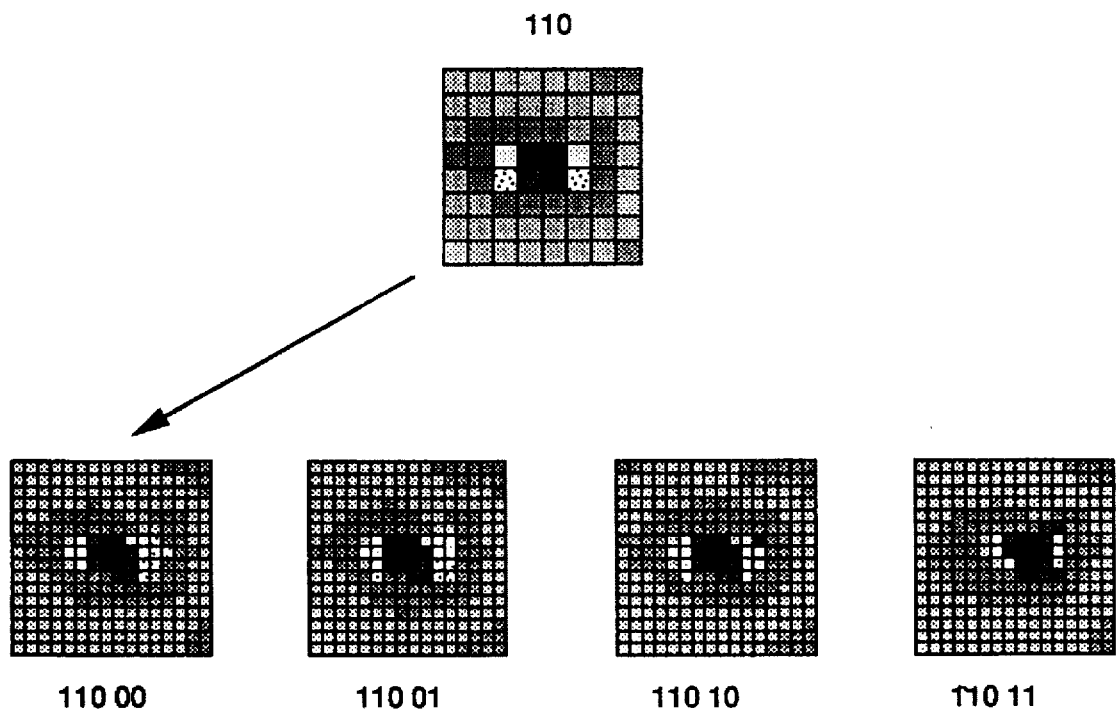
FIG. 8 illustrates in pixel level form a low quality codebook entry and four higher quality codebook entries associated therewith.

FIG. 8 illustrates codebooks wherein the high and low quality codebooks have different pixel resolutions. Block 80 is an 8×8 pixel block of an eye-feature in a low quality codebook. It has associated with it four high quality 16×16 pixel blocks, 82, 84, 86, and 88.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

Advantageous Technical Effects

A compression method can be devised which can render images at more than one quality level depending upon the data capacity of the storage media. The perceived advantages of this method are:

1. A POS terminal does not have to store two completely independent sets of codebooks.
2. A developer of a POS terminal might wish to reduce costs by only having a low quality set of codebooks, even though the data capacity of the transaction card would support higher quality. The transaction card reader would be able to use the higher quality data stream and strip off the unused bits.

| Parts List: | |
|---|---|
| 10 | Transaction card |
| 10' | Transaction card |
| 12 | Magnetic storage stripe |
| 14 | Integrated circuit |
| 16 | Card reader |
| 18 | Point-of-sale terminal (POS) |
| 18' | Point-of-sale terminal (POS) |
| 20 | Display |
| 20' | Display |
| 22 | Receipt printer |
| 24 | Image data source |
| 30 | Image |
| 32 | Standardizing process |
| 34 | Compressor |
| 36 | Recording device |
| 40 | Block |
| 42 | Block |
| 44 | High quality decompress |
| 46 | Low quality decompress |
| 48 | Display image function |
| 50 | Low quality image bit stream |
| 52 | 3-bit codebook pointer |
| 54 | High quality image bit stream |
| 56 | 5-bit codebook pointer |
| 60 | Low quality image bit stream |
| 62 | 3-bit codebook pointer |
| 64 | High quality image bit stream |
| 66 | First 3 bits of 5-bit codebook pointer |
| 68 | Last 2 bits of 5-bit codebook pointer |
| 80 | 8 × 8 pixel block low quality codebook entry |
| 82 | 16 × 16 pixel block high quality codebook entry |
| 84 | 16 × 16 pixel block high quality codebook entry |
| 86 | 16 × 16 pixel block high quality codebook entry |
| 88 | 16 × 16 pixel block high quality codebook entry |

We claim:

1. A method for decompressing an image on a transaction card to a first quality level and for augmenting the image at the first quality level to a second quality level with augmented data not stored on the transaction card, comprising the steps of:
   a. providing at least one decompression codebook corresponding to the first and the second quality level of compressed image data and augmented data, respectively;
   b. determining the first quality level of the compressed image stored on the transaction card;
   c. decompressing the compressed image data to the first quality level; and
   d. combining the augmented data with the decompressed image of the first quality level to form the decompressed image of the second quality level.

2. A method for decompressing indicia stored on a transaction card said indicia representing an image stored at a first quality level to form an image of a second quality level, where the indicia stored on the transaction card can be decompressed either to the first or a second quality level, comprising the steps of:
   a. providing at least one decompression codebook corresponding to the first quality level of compressed image data and to augmented data, respectively;
   b. decompressing the compressed image data to the first quality level; and
   c. combining the augmented data with the decompressed image of the first quality level to form the decompressed image of the second quality level.

* * * * *